United States Patent
D'Acunto et al.

(10) Patent No.: US 9,539,771 B2
(45) Date of Patent: Jan. 10, 2017

(54) DEVICE FOR MAKING A PART OF A COMPOSITE MATERIAL BY RESIN-TRANSFER MOULDING

(75) Inventors: Alain D'Acunto, Saint Barbe (FR); Patrick Martin, Villers-les-Nancy (FR); Marius Mihaluta, Metz (FR); Henri-François Perrin, Pontoy (FR); Louis Bettega, Boucheporn (FR); Jean-Pierre Cauchois, Obersteinbach (FR); Jéróme Cini, Laitre S/s Amance (FR); Serge Pradella, Longjumeau (FR); Paulo Francisco, Bezons (FR)

(73) Assignees: SOCIETE LORRAINE DE CONSTRUCTION AERONAUTIQUE, Florange (FR); ARTS & METIERS PARIS TECH, Metz (FR); ATELIERS CINI, Tomblaine (FR)

( * ) Notice: Subject to any disclaimer, the term of this patent is extended or adjusted under 35 U.S.C. 154(b) by 244 days.

(21) Appl. No.: 13/144,706

(22) PCT Filed: Jan. 18, 2010

(86) PCT No.: PCT/FR2010/000039
§ 371 (c)(1),
(2), (4) Date: Sep. 1, 2011

(87) PCT Pub. No.: WO2010/084263
PCT Pub. Date: Jul. 29, 2010

(65) Prior Publication Data
US 2011/0309547 A1   Dec. 22, 2011

(30) Foreign Application Priority Data

Jan. 23, 2009   (FR) ..................................... 09 00300

(51) Int. Cl.
*B29C 70/44*   (2006.01)
*B29C 33/30*   (2006.01)
(Continued)

(52) U.S. Cl.
CPC ........... *B29C 70/443* (2013.01); *B29C 33/306* (2013.01); *B29C 70/48* (2013.01); *B29D 99/0014* (2013.01)

(58) Field of Classification Search
None
See application file for complete search history.

(56) References Cited

U.S. PATENT DOCUMENTS 3,710,733 A * 1/1973 Story .......................... 108/57.28
4,551,084 A * 11/1985 Lake ............................ 425/185
(Continued)

FOREIGN PATENT DOCUMENTS

EP   1859920 A1   11/2007

OTHER PUBLICATIONS

International Search Report PCT/FR2010/000039; Dated Jun. 11, 2011.

*Primary Examiner* — Edmund Lee
(74) *Attorney, Agent, or Firm* — Cantorcolburn LLP

(57) ABSTRACT

The invention related to a device for making a part of a composite material by resin-transfer molding, that includes a manufacturing mold in which is placed a blank of the part to be impregnated with resin, characterized in that the manufacturing mold is divided into a matrix and one or more mobile structural member to be indexed on the matrix, the whole defining, after assembly, an imprint corresponding to the shape of the part to be manufactured.

6 Claims, 2 Drawing Sheets

(51) Int. Cl.
*B29C 70/48* (2006.01)
*B29D 99/00* (2010.01)

(56) References Cited

U.S. PATENT DOCUMENTS

| | | | |
|---|---|---|---|
| 5,665,301 A * | 9/1997 | Alanko | 264/571 |
| 5,902,535 A * | 5/1999 | Burgess et al. | 264/257 |
| 5,939,013 A * | 8/1999 | Han et al. | 264/510 |
| 6,391,246 B2 * | 5/2002 | Shiraishi et al. | 264/510 |
| 6,557,201 B1 | 5/2003 | Bowman | |
| 7,413,695 B2 * | 8/2008 | Thrash et al. | 264/257 |
| 2007/0108646 A1 * | 5/2007 | Louderback et al. | 264/40.5 |
| 2008/0044630 A1 * | 2/2008 | Lusk et al. | 428/172 |
| 2009/0051076 A1 * | 2/2009 | Kofoed et al. | 264/258 |

\* cited by examiner

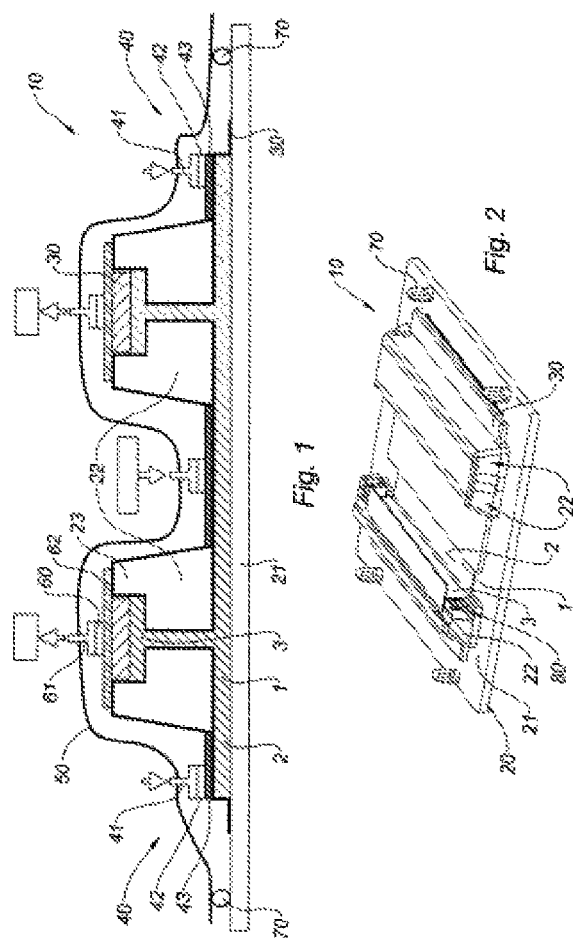

DEVICE FOR MAKING A PART OF A COMPOSITE MATERIAL BY RESIN-TRANSFER MOULDING

TECHNICAL FIELD

The invention relates to a device for making parts in composite material by resin-transfer moulding and to a method for applying this device on the other hand.

BACKGROUND

Several known moulding methods by impregnation of fibres with resin may be used for making parts in composite material and notably moulding methods using closed moulds.

Firstly, mention may be made of the resin-transfer moulding or RTM method.

In this RTM method, a set of fibre elements is positioned in a particular way around a support and the set is placed inside a closed mould, the general shape of which corresponds to that of the part to be made.

In the traditional RTM method, this mould consists of a female mould or matrix and a counter-mould portion or punch.

A resin is then injected into the mould and polymerised by providing energy to it. The molecules of this resin then begin to bind together and form a solid network. A rigid part in composite material formed with fibres and polymerised resin is then obtained.

Mention may also be made of the resin infusion moulding method.

Generally, such a method applies several steps among which appears the placement of fibre reinforcing elements on the shape of a mould.

The mould is then closed via a flexible lid allowing controlled passage of a resin which will infuse inside the fibre reinforcing elements and then polymerise, in order to provide a rigid part.

The propagation of the resin is accomplished by a driving force generated by a depression in certain points of the lid, towards which moves the resin introduced into the mould.

In the traditional infusion method, moulding tooling is thus formed with a matrix mould and a sealed lid such as a cover as a counter-mould portion.

These methods whether these are standard RTM or resin infusion moulding methods, are technologies in which the moulding tooling is heavy and designed for a specific part shape intended to be made. This generates high tooling costs in order to be able to produce very diverse parts.

Further, this tooling may have a very limited lifetime. Indeed, it is understood that in standard RTM tooling, deterioration of the matrix mould or of the counter-mould or of both of them involves deterioration of the thereby formed tooling in its entirety.

Finally, because of the complex development of moulding tooling adapted to a specific type of part in a composite material, these technologies are limited to shapes of parts in composite material which are not very or moderately complex, the characteristics of which are not very elaborated.

BRIEF SUMMARY

The present invention aims at solving the aforementioned drawbacks.

Thus, the invention proposes a device for making parts in composite material by resin-injection moulding, the complexity of which is reduced and the moulding tooling is simplified as compared with the tooling of the aforementioned methods with a closed mould.

The invention further proposes a device for making parts in composite material by resin-injection moulding, the moulding tooling of which is flexible, adaptable to the shape of the parts to be designed while being easily replaceable.

It is also desirable to provide a device for making parts in composite material by resin-injection moulding with which the drawbacks of the RTM method and of the resin-infusion moulding method may be suppressed while benefiting from their respective advantages.

Thus, the invention also proposes a device for making parts in composite material by resin-injection moulding with which costs and times for manufacturing and preparing the parts in composite material may be reduced.

For this purpose, the invention relates to a device for making a part in composite material by resin injection moulding comprising a manufacturing mould in which a blank of the part, which may be impregnated with resin, is intended to be positioned, remarkable in that the manufacturing mould is subdivided into a matrix and one or several mobile structural elements intended to be indexed on the matrix, the whole forming after assembly an imprint corresponding to the shape of the part to be manufactured.

It should be specified that of course the matrix may be of any shape.

The device according to the invention may comprise one of the following features taken alone or as a combination:
  the matrix has a planar shape;
  the structural elements which may be disassembled are independent three-dimensional geometrical blocks, the shape and the dimensions of which are adapted to the shape and to the dimensions of the part to be made
  the structural elements which may be disassembled may include flexible or rigid cores of any type, the shape and the dimensions of which are adapted to hollow structures;
  the structural elements are capable of homogeneously distributing the resin;
  the structural elements of the mould are capable of providing a vent role;
  the device further comprises injection means adapted for carrying out mixed impregnation of the blank with the injected resin;
  the injection means are distributed over the surface of the mould so that it promotes diffusion of the resin transversely and/or laminarly;
  the device further comprises a seal system of the structural elements with regard to the resin injected into the manufacturing mould.

The invention further provides a method for applying the device defined above, this method comprising at least one step in which one or several mobile structural elements of the mould are indexed on the matrix of the mould so that the whole forms, after assembly, an imprint corresponding to the shape of the part to be manufactured.

The method according to the invention may also comprise the following feature:

The invention further comprises a step in which transverse impregnation is achieved with respect to a plane of the blank and laminar impregnation is achieved relatively to this plane of the blank simultaneously.

BRIEF DESCRIPTION OF THE DRAWINGS

The invention will be better understood and other advantages and features will become apparent upon reading the description which follows, given as a non-limiting example, and by means of the appended drawings wherein:

FIG. 1 is a sectional view of an embodiment of a device for making a part in composite material by resin-injection moulding according to the invention;

FIG. 2 is a perspective view of the device of FIG. 1;

DETAILED DESCRIPTION

Figure 3:
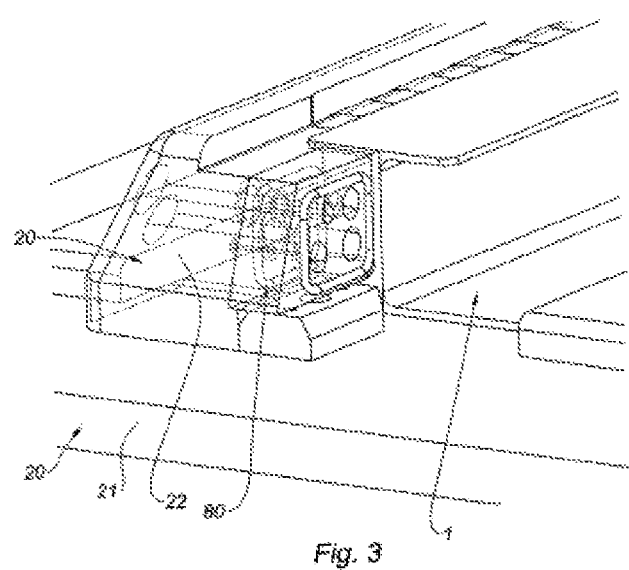
FIG. 3 is a enlarged perspective view of a seal system of the device of FIG. 2.

Making a part in composite material essentially comprises molding by means of a suitable manufacturing device a composite element by injecting liquid resin in a framework of essentially dry, reinforcing fibers, preformed beforehand substantially according to the shape of the profile of the part and pre-positioned in a closed mould.

A device 10 for making a part in composite material by resin-injection molding is seen in FIGS. 1 and 2.

This manufacturing device 10 comprises a molding cavity (not shown) intended to receive a manufacturing mould 20 in which a blank 1 which may be impregnated with resin for making the part in composite material, is intended to be positioned.

According to the invention, the mould 20 is sub-divided into a molding matrix 21 upon which one or several independent and mobile molding structural elements 22 will rest and be indexed so that the whole forms, after assembly, an imprint corresponding to the shape of the profile of the part to be designed.

The molding matrix 21 is planar in this case and only as an example.

The structural elements 22 as for them are capable of being displaced on the molding matrix 21 depending on the shape of the parts to be made. These are three-dimensional geometrical blocks 23, the shape, dimensions, thickness and positioning of which on the matrix 21 are adapted according to the shape of the profile of the part to be manufactured. Thus they observe the geometrical, dimensional and thickness constraints of the part.

It will be easily understood that such a mould has the advantage of being simple to apply, flexible, adaptable to the shape of the parts to be designed.

Indeed a single mould gives the possibility of designing different types of parts in composite material, thereby reducing the costs related to tooling.

Moreover, with such a mould, the different constitutive elements are easily replaceable without it being necessary to replace the whole of the mould. The lifetime of the mould is thereby improved.

With such tooling, the blank 1 of the reinforcing fibers is made on the one hand and the final part in composite material is made on the other hand.

In the non-limiting example illustrated in FIGS. 1 and 2, two series of two identical structural elements 22 are laid out in parallel on the molding matrix 21 so as to form a blank 1 having a planar base 2 provided with protrusions 3.

In an alternative embodiment, such molding tooling may be used for making two-dimensional parts in composite material.

Further, it is also adapted so as to be used during the making of parts with a monolithic, sandwich structure or integrating hollow cores.

Moreover, as illustrated in FIGS. 1 and 2, the manufacturing device 10 also comprises means 30 for covering the produced blank 1 such as lids distributed over the surface of the blank 1, not covered with structural molding elements 22. In a non-limiting example of the present invention, two lids each positioned on the bar of the T of the protrusions 3 of the formed blank 1 may thus be seen in FIG. 1. These lids give the possibility of ensuring proper geometrical conformation of the upper portion of the protrusions 3.

In order to impregnate the blank 1 with resin, the mould 20 is connected to a resin container (not shown) itself placed inside heating means (not shown) such as an oven or any other suitable heating means. The container is connected to the mould 20 through resin-injection means 40.

These resin-injection means 40 comprise several resin injectors 41 each associated in a known way to a dispenser 42, the whole being positioned on a dispensing grid 43 lying on a portion of the covering means 30.

These injection means 40 are distributed over the whole surface of the mould 20 so as to achieve mixed impregnation, i.e. transverse impregnation and/or laminar impregnation of the blank 1 with the injected resin in a simultaneous or sequenced way. The transverse impregnation mode is related to the presence of the dispensing grid 43. The laminar impregnation mode is related to the absence of any dispensing grid 43.

Further, the moulding structural elements 22 of the mould are capable of guaranteeing compaction of the blank 3 and proportioning of the relevant areas by the structural elements 22 in the mould 20 in a homogeneous way.

Moreover, as illustrated in FIG. 1, the mould 20 is associated with a cover 50 intended for closing the mould 20 and ensuring the role of a counter-mould.

This cover 50 is a membrane impervious to gases, which covers the whole of the moulding matrix 21, of the blank 1 and of the moulding structural elements 22. It may be made from plastic, resin or from any other known means.

Moreover, it has through-passages made for receiving the injectors 41 of the resin-injection means 40 and the vents described later on.

The mould 20 is also equipped with peripheral seal gaskets 70 ensuring the seal between the cover 50 and the mould 20, the whole thereby forming a sealed space materialising the volume of the part to be manufactured.

In an alternative embodiment of the device 10 of the present invention, a second cover may be used for guaranteeing the seal and ensuring homogeneous and continuous compaction of the blank 1 during the phase for polymerisation of the resin injected into the blank 1.

The resin-injection is carried out in vacuo. Via the cover 50 and the seal gaskets 70, a pressure difference may thereby be achieved between the outside and the sealed space, this difference exerting a compressive force upon injecting the resin, on the blank 1 located inside the sealed space.

For this, the device 10 comprises vacuum application means 60. These means comprise a vacuum pump (not shown) associated with vents 61 i.e. degassing conduits allowing discharge of the air and of the evolved gases during the injection of resin into the mould 20.

In the non-limiting example illustrated in FIG. 1, a vent 61 is placed at the top of each of the two series of moulding structural elements 22 of the mould 20 via a flow brake 62.

Advantageously, the moulding structural elements 22 of the mould 20 associated with the covering elements 30 are capable of ensuring the function of vents 61.

Moreover, in an embodiment of the present invention, the mould 20 may be positioned inside a heating device (not shown). As non-limiting examples of a heating device, mention may be made of an oven, an autoclave or a self-heating mould. The installation of this device in an autoclave provides the possibility of increasing the compaction forces exerted on the cover 50 and of increasing the driving force for transferring the resin into the blank 1.

As is illustrated in FIGS. 2 and 3, the device 10 may also comprise a seal system 80 intended to avoid penetration of the resin injected into the mould 20 into the structural elements 22 of the latter. This protection is achieved by an O-ring gasket 80.

A method for applying the device 10 described earlier is the following.

Firstly, a framework of dry fibre reinforcements is placed, which will design the part in composite material on the moulding matrix 21 of the mould of the device 10.

Next, one or more predetermined moulding structural elements 22 are flattened on all or part of the blank in a configuration depending on the profile of the composite material part to be manufactured. The whole of the protrusions 3 are then sandwiched between the matrix 21 and the moulding structural elements 22, thereby ensuring the making of the blank 1.

In the following step, the whole is capped by the cover 50 in order to close the mould 20, a cover 50 under which the injection means 40 and the vents 61 will have been positioned beforehand.

Preliminarily and if required, a degassing step may be carried out, in which the resin in the container is degassed in order to avoid too many bubbles from being injected into the mould via the conduits of the injectors.

If required, the resin is heated in order to obtain a viscosity adapted to the resin transfer into the blank 1. The resin used may be a thermosetting or thermoplastic resin.

In the following step, it is proceeded with injection of the resin with injectors 41 put into the device 10 for this purpose.

Preferably, resin infusion is then carried out while maintaining a vacuum.

The resin spreads into the blank 1 by filling the empty areas which separate the fibre reinforcements and impregnates them.

According to the invention, the resin impregnation of the blank 1 is achieved in a simultaneous or sequenced way.

This gives the advantage of providing the part to be designed with dimensional tolerances on the sensitive areas of the part (protrusions 3), unlike ordinary areas for which the dimensional tolerance may be less restrictive.

Further, because of the possibility of positioning resin dispensers in a multiple way on the surface of the mould, the manufacturing cycle time of a part is reduced since the injection time is itself reduced.

The vacuum generated by means of a vacuum pump associated with the vents 61 generates, as described earlier, a pressure difference between the sealed space delimited by the cover 50 and the mould 20 of the device 10 and the outside.

In this way, the outside air generates a compressive force acting on the cover 50 which is pressed onto the moulding structural elements 22 and the blank 1 facilitating infusion of the resin into the blank 1.

In the following step, it is proceeded with polymerisation of the resin, either at room temperature or by heating. The molecules of this resin bind together and form a solid network. A rigid part in composite material formed with fibres and polymerised resin is thereby obtained.

The part in composite material is then removed from the mould when the cover 50 is withdrawn. This part has the shape defined by the association of the moulding matrix 21 and of the mobile structural elements 22 of the mould 20 of the device 10.

One skilled in the art will, as compared with known devices for making parts in composite material, appreciate a device providing simplified tooling which is not limited to the making of a single specific part shape.

Of course, the invention is not limited to the sole embodiments of the device described above as examples but it encompasses on the contrary all the possible alternatives.

The invention claimed is:

1. A device for making a part in composite material by resin-injection molding comprising a manufacturing mold in which a blank of the part capable of being impregnated with resin is intended to be placed, the blank having a planar base with at least one protrusion, wherein the manufacturing mold is subdivided into a matrix and one or several mobile structural elements intended to be indexed on the matrix, wherein the at least one protrusion is surrounded by the structural elements and a portion of the at least one protrusion not covered by the structural elements is disposed beneath a covering element, the whole forms, after assembly, an imprint corresponding to a shape of the part to be manufactured, wherein the structural elements are capable of ensuring a role of a vent, further including injection means positioned on a dispensing grid and being distributed over a surface of the mold configured for promoting diffusion of the resin in a transverse and/or laminar way, such that the structural elements are capable of guaranteeing compaction of the blank and proportioning of the relevant areas by the structural elements in the mould in a homogeneous way.

2. The device according to claim 1, wherein the matrix has a planar shape.

3. The device according to claim 1, wherein the structural elements which may be disassembled are independent three-dimensional geometrical blocks, shape and dimensions of which are adapted to shape and to the dimensions of the part to be manufactured.

4. The device according to claim 1, wherein the structural elements which may be disassembled may include flexible or rigid cores of any type, shape and the dimensions of which are adapted to hollow structures.

5. The device according to claim 1, wherein the injection means are adapted for achieving impregnation of the blank with the injected resin in a simultaneous or sequenced way.

6. The device according to claim 1, further comprising a seal system of the structural elements with regard to the resin injected into the manufacturing mold.

* * * * *